US006285375B1

(12) United States Patent
John, Jr.

(10) Patent No.: US 6,285,375 B1
(45) Date of Patent: Sep. 4, 2001

(54) ALGORITHM TO TRANSFORM GENERALIZED POLYGONS TO TRAPEZOIDS

(75) Inventor: Chester Charles John, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/246,020

(22) Filed: Feb. 5, 1999

(51) Int. Cl.[7] .................................................... G06T 11/60
(52) U.S. Cl. ........................... 345/440; 345/441; 345/443
(58) Field of Search .................................... 345/441, 434, 345/423, 433, 431, 419, 422, 421, 501, 526, 440, 443; 716/20; 702/33; 358/261.1

(56) References Cited

U.S. PATENT DOCUMENTS

| | | | |
|---|---|---|---|
| 4,933,889 * | 6/1990 | Meshkat et al. | 716/20 |
| 4,962,468 | 10/1990 | Beauregard et al. | 364/521 |
| 5,129,051 | 7/1992 | Cain | 395/133 |
| 5,268,995 * | 12/1993 | Diefendorff et al. | 345/422 |
| 5,276,783 * | 1/1994 | Fossum | 345/423 |
| 5,283,860 | 2/1994 | Einkauf et al. | 395/134 |
| 5,295,235 * | 3/1994 | Newman | 345/433 |
| 5,349,643 | 9/1994 | Cox et al. | 380/25 |
| 5,371,840 | 12/1994 | Fischer et al. | 395/133 |
| 5,570,460 | 10/1996 | Ramanujam | 395/124 |
| 5,579,459 | 11/1996 | Jennye | 395/134 |
| 5,613,050 | 3/1997 | Hochmuth et al. | 395/122 |
| 5,630,039 * | 5/1997 | Fossum | 345/434 |

OTHER PUBLICATIONS

Parallel Polygon Clipping, May 1994, IBM Technical Disclosure Bulletin, vol. 37, No. 05, pp. 295–307.

* cited by examiner

*Primary Examiner*—Matthew Luu
*Assistant Examiner*—Thu-Thao Havan
(74) *Attorney, Agent, or Firm*—Jeffrey S. LaBaw; Bracewell & Patterson, L.L.P.

(57) ABSTRACT

General polygons are broken into trapezoids and/or triangles and exported to a graphics adapter for rendering. Intersecting line segments are broken at the point of inter-section. Simple polygons are then derived from the general polygon by starting at an outside corner and selecting line segments defining the general polygon utilizing criteria which will identify closed paths bounding a single area (e.g., always selecting the line segment which extends in a direction identical to or clockwise from the direction of the last selected line segment). Selected line segments are added to a current polygon definition. Each time an inter-section point is entered twice, the selected line segments from the first exit to the second entry of that intersection point are segregated into a separate polygon definition in the polygon list. Once all simple polygons have been identified, each polygon is broken into trapezoids and/or triangles. A base connection point or line segment having the lowest y-coordinate value is identified, together with adjoining line segments. A trapezoid or triangle is then delimited including at least one adjoining line segment, and the process in repeated until all line segments bounding the simple polygon have been added to at least one primitive definition in a primitive list. The primitives may then be exported to the graphics adapter for rendering. Although processor cycles are required to break the general polygon into primitives, in most cases the work required should be significantly less than that involves in breaking the general polygon into scan lines and generating pixel information for the graphics adapter.

21 Claims, 7 Drawing Sheets

General polygon received for display
402
404
Intersecting line segments ?
No
Yes
406
Break both intersection line segments at point of intersection
408
Find outside corner; select segment connected to corner
410
Go to opposite end of last-selected segment
412
Multiple connecting line segments ?
Yes
No
416
414
Select one (clockwise) connecting segment; add to polygon
Create separate polygon for trivial pair or add connecting segment to polygon
418
420
Intersection entered twice ?
Yes
All segments added to a polygon ?
Yes
No
422
No
Create separate polygon for first exit to second entry; select connecting segment
A

ALGORITHM TO TRANSFORM GENERALIZED POLYGONS TO TRAPEZOIDS

BACKGROUND OF THE INVENTION

1. Technical Field

The present invention relates in general to graphics rendering in data processing systems and in particular to polygon processing to generate primitives during graphics rendering. Still more particularly, the present invention relates to converting general polygons to trapezoidal primitives which a display adapter within a data processing system is capable of rendering.

2. Description of the Related Art

Data processing systems commonly include graphics adapters (also referred to as "display adapters") which receive primitives (e.g., points, lines, or polygons) from the processor for rendering, the process of generating pixel information for a display. The processor may thus write certain, simple primitives to the graphics adapter, which breaks the primitive into scan lines and renders the pixels within each scan line, thereby shifting the overhead associated with breaking the primitive into scan lines and freeing the processor to execute other tasks.

While most contemporary graphics adapters support primitives which are triangles or trapezoids, other polygons, including general polygons, are typically broken into scan lines by the display engine for the operating system or an application, and the scan lines are then sent to the graphics adapter. This consumes processor cycles and may leave the graphics adapter idle, negating the benefits of having a graphics adapter within the data processing system.

It would be desirable, therefore, to provide a mechanism for sending general polygons to a display adapter for rendering.

SUMMARY OF THE INVENTION

It is therefore one object of the present invention to provide an improved method and apparatus for graphics rendering in data processing system.

It is another object of the present invention to provide and method and apparatus for polygon processing to generate primitives during graphics rendering in data processing systems.

It is yet another object of the present invention to provide a method and apparatus for converting general polygons to trapezoidal primitives which a display adapter within a data processing system is capable of rendering.

The foregoing objects are achieved as is now described. General polygons are broken into trapezoids and/or triangles and exported to a graphics adapter for rendering. Intersecting line segments are broken at the point of inter-section. Simple polygons are then derived from the general polygon by starting at an outside corner and selecting line segments defining the general polygon utilizing criteria which will identify closed paths bounding a single area (e.g., always selecting the line segment which extends in a direction identical to or clockwise from the direction of the last selected line segment). Selected line segments are added to a current polygon definition. Each time an inter-section point is entered twice, the selected line segments from the first exit to the second entry of that intersection point are segregated into a separate polygon definition in the polygon list. Once all simple polygons have been identified, each polygon is broken into trapezoids and/or triangles. A base connection point or line segment having the lowest y-coordinate value is identified, together with adjoining line segments. A trapezoid or triangle is then delimited including at least one adjoining line segment, and the process in repeated until all line segments bounding the simple polygon have been added to at least one primitive definition in a primitive list. The primitives may then be exported to the graphics adapter for rendering. Although processor cycles are required to break the general polygon into primitives, in most cases the work required should be significantly less than that involves in breaking the general polygon into scan lines and generating pixel information for the graphics adapter.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
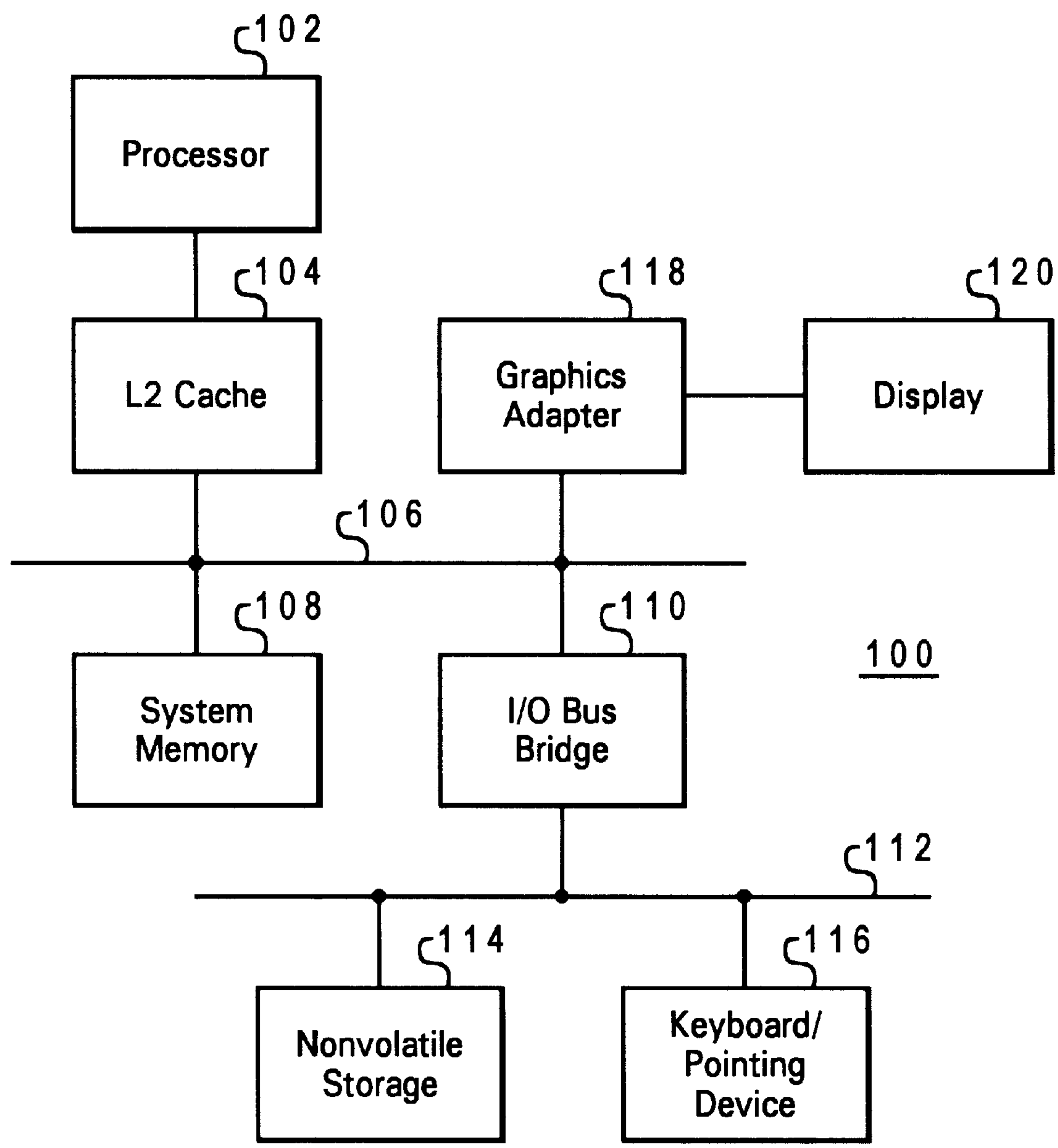
FIG. 1 depicts a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® desktop personal computer models available from International Business Machines Corporation of Armonk, New York. Data processing system 100 includes a processor 102, which in the exemplary embodiment is connected to a level two (L2) cache 104, which is connected in turn to a system bus 106.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

In a preferred embodiment, data processing system 100 includes graphics adapter 118 connected to system bus 106, receiving primitives for rendering from processor 102 and generating pixels for display 120, or alternatively receiving scan line pixel information. General polygons are preferably converted by processor 102 into trapezoidal or triangular primitives which the graphics adapter is capable of rendering, then transmitted to graphics adapter 118 for rendering.

The operation of data processing system 100 is well known to those in the art. A basic input/output system (BIOS) is stored in a nonvolatile memory (not shown) and loaded on system power-up to establish communications between processor 102 and other devices. An operating system such as the Windows™ operating system available from Microsoft Corporation of Redmond, Washington, is stored in nonvolatile storage 114 and loaded at system start-up to allow a user to execute applications and utilize controls such as keyboard/pointing device 116. The process of the present invention for converting general polygons into trapezoidal or triangular primitives may form part of a display driver for the operating system or for an application.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Figure 2A:
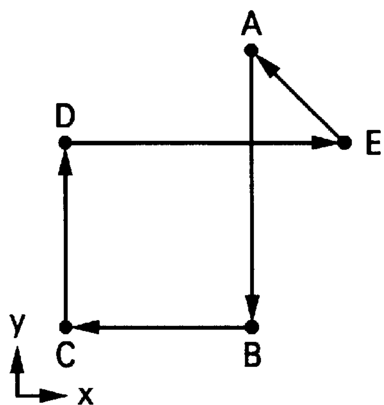
FIGS. 2A–2H are a series of diagrams illustrating a portion of a process for converting general polygons into trapezoidal primitives in accordance with a preferred embodiment of the present invention.

Referring to FIGS. 2A through 2H, a series of diagrams illustrating a first portion of a process for converting general polygons into trapezoidal primitives in accordance with a preferred embodiment of the present invention is shown. Most graphics adapters are capable of rendering trapezoidal primitives (which, as used herein, includes triangular and single line segment primitives). FIG. 2A illustrates a general polygonal display object, comprising a directed path having the same start and end points. The polygon in the example shown consists of line segments AB, BC, CD, DE and EA defined by (x, y) coordinate pairs for the endpoints A, B, C, D, and E. The polygon illustrated is not necessarily typical or representative of general polygons which will commonly require conversion during actual operation of a data processing system, but is selected to best explain the process of the present invention.

The first portion of the process for converting general polygons into trapezoids for rendering by a graphics adapter, and the process illustrated by FIGS. 2A–2H, involves breaking a general polygon into simple polygons, if necessary. The first step in converting a general polygon to one or more simple polygons is to convert the general polygon into a noncrossing general polygon. For this, each unique pair of line segments is checked to determine if they intersect. This may be simply achieved by simultaneous solution of two slope-intercept equations (y=mx+b) describing infinite lines including the line segments, then determining whether any intersection point line found by simultaneous solution of the two equations lies within the line segments which are of interest. This and other techniques for determining intersection of two line segments are well known in the art.

The number of line segment comparisons which must be made to convert a general polygon into a noncrossing general polygon is at most $n^2$, where n is the number of line segments forming the general polygon. For the example of FIG. 2A, n equals five. However, since only unique pairs of line segments need to be tested, the number of comparisons required may be reduced to (n−1)!. Table I lists the line segment comparisons which must be made for the example of FIG. 2A.

TABLE I

| | AB | BC | CD | DE | EA |
|---|---|---|---|---|---|
| AB | — | X | X | X | X |
| BC | — | — | X | X | X |
| CD | — | — | — | X | X |
| DE | — | — | — | — | X |
| EA | — | — | — | — | — |

Comparisons which must be made are identified by an "X", while comparisons which may be skipped are identified by a dash ("–")

Figure 2B:
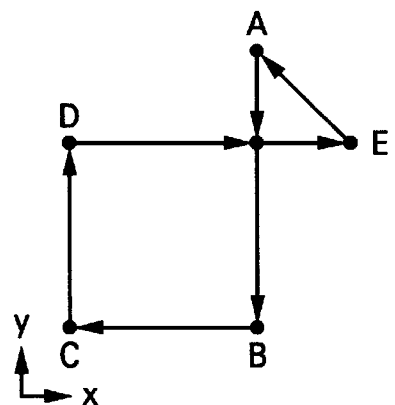

For each pair of intersecting line segments identified, both line segments are broken into two pieces with the intersection point serving as an endpoint for each new line segment. For the example shown in FIG. 2A, intersection point F is identified as shown in FIG. 2B, and line segments AB and DE are broken into line segments AF, FB and DF, FE, respectively. The noncrossing general polygon thus consists of line segments AF, FB, BC, CD, DF, FE and EA. For convenience in processing, the noncrossing general polygon may be represented as an ordered list of line segment endpoints:

$(x_A, y_A)$;
$(x_F, y_F)$;
$(x_B, y_B)$;
$(x_C, y_C$;
$(x_D, y_D)$;
$(x_F, y_F)$;
$(x_E, y_E)$;
$(x_A, y_A)$. Alternatively, the noncrossing general polygon may be represented as a set of coordinate pairs each defining a different line segment in the polygon:

$(x_A, y_A)$: $(x_F, y_F)$;
$(x_F, y_F)$: $(x_B, y_B)$;
$(x_B, y_B)$: $(x_C, y_C)$;
$(x_C, y_C)$: $(x_D, y_D)$;
$(x_D, y_D)$: $(x_F, y_F)$;
$(x_F, y_F)$: $(x_E, y_E)$;
$(x_E, y_E)$: $(x_A, y_A)$.

Once a noncrossing general polygon has been derived, the display object is next converted to simple polygons, which are noncrossing, closed, directed paths defining the perimeter of a single area. This is accomplished by first finding an outside corner for the noncrossing general polygon. In this example, the endpoint with smallest y value is selected. If more than one endpoint has the same y value, and that value is also the smallest y value in the endpoint list (as for endpoints C and B in FIG. 2B), the endpoint with the smallest x value is selected from the group having the smallest y value. However, those skilled in the art will appreciate that an appropriate "outside corner" may be determined from any of: the smallest y value, and the smallest x value for that y value (endpoint C in FIG. 2B); the smallest y value, and the largest x value for that y value (endpoint B in FIG. 2B); the largest y value, and the smallest x value for that y value (endpoint A in FIG. 2B); the largest y value, and the largest x value for that y value (also endpoint A in FIG. 2B); the smallest x value, and the smallest y value for that x value (endpoint C in FIG. 2B); the smallest x value, and the largest y value for that x value (endpoint D in FIG. 2B); the largest x value, and smallest y value for that x value (endpoint E in FIG. 2B); or the largest x value, and largest y value for that x value (also endpoint E in FIG. 2B). Other techniques may also be employed to find an appropriate starting point.

Figure 2C:
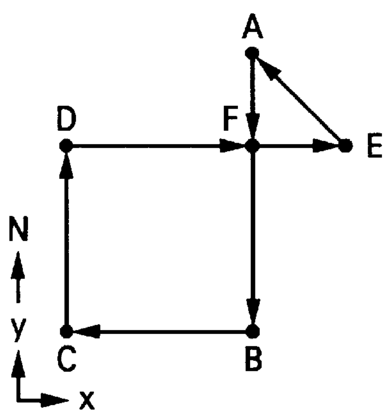

In the present example, endpoint C is selected as the starting point, and is the first endpoint utilized to define the first simple polygon Pl. Next, following the direction of the line segments when exiting a point, line segments are sequentially removed from the noncrossing general polygon definition and added to the simple polygon definition. For the polygon of the example, line segment CD is thus the first line segment selected, as shown in FIG. 2C. The opposite endpoint D is thus added to a list of endpoints for the first polygon:

$P_1=\{(x_C, y_C);(x_D, y_D)\}$.

Alternatively, the line segment is added as to a list of line segments defining the first polygon:

$P_1=\{(x_C, y_C):(x_D, y_D)\}$.

From the opposite endpoint of the first segment added to the definition for polygon $P_1$—in this case, endpoint D—the line segment exiting that point is identified. This may be accomplished by determining all line segments having an endpoint in common with the opposite or last-entered endpoint (endpoint D in FIG. 2C) of the first line segment CD. If only one line segment exits that endpoint—as is the case for endpoint D in FIG. 2C, which is shared by only line segments CD and DF—the other line segment is selected and added to the polygon definition:

$P_1=\{(x_C, y_C);(x_D, y_D);(x_F, y_F)\}$, or $P_1=\{(x_C, y_C):(x_D, y_D);$
$(x_D, y_D):(x_F, y_F)\}$.

Figure 2D:
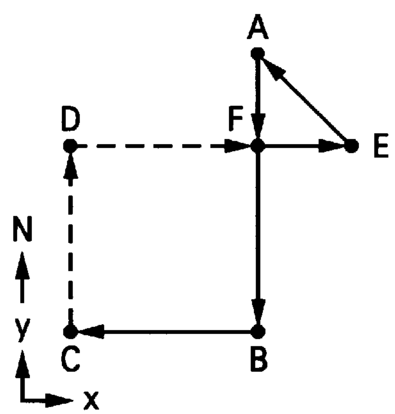

FIG. 2D illustrates the line segments (CD and DF) added to the polygon definition up to this point in the process.

The process is repeated as each new line segment is removed from the general polygon definition and added to the simple polygon definition. Line segments exiting the endpoint of the last line segment are identified. If only one other line segment is found, that line segment is added to the simple polygon definition. If more than one line segment is found connected to the last entered line segment, however, as is the case at endpoint F in FIG. 2D, the connected line segment extending in the same direction as the last entered line segment or clockwise from the direction of the last entered line segment is selected.

The determination of whether a connecting line segment lies in the same direction or clockwise from the same direction as the last entered segment requires consideration of the relative positions of the endpoints forming the last entered line segment. Thus, for a directed line segment $L=((x_i, y_i), (x_j, y_i))$, the bearing, slope, and direction of the directed line segment may be calculated from:

bearing(L)=signum($x_j-x_i$),
slope(L)={if bearing(L)!=0,
$(y_j-y_i)/(x_j-x_i)$;
else signum $(y_j-y_i)$}, and
direction(L)=(bearing(L), slope(L)).

The (descending) order relation of directed line segments M and N may then be defined as:

direction(M)>direction(N) if{
bearing(M)=−1 and bearing(N)≧0; or
bearing(M)=0, slope(M)<0, and bearing(N)=1; or
bearing(M)=bearing(N)=1 and slope(N)>slope(M); or
bearing(M)=bearing(N)=−1 and slope(N)<slope(M)}.

The equality relation of directed line segments M and N may be defined as:

direction(M)=direction(N) if{
bearing(M)=bearing(N); and
slope(M)=slope(N)}.

For a directed line segment L entering a point A from which a set of directed line segments $AS=\{M_1, M_2, \ldots, M_n\}$ exits, the directed line segment clockwise from directed line segment L may be defined as:

clockwise(L)={if (direction(L)>direction $(M_i)$
for i=1−n), $M_{min}$;
else $M_{min+}$}, where $M_{min}$ is the directed line segment within set AS having the minimum direction and $M_{min+}$ is the directed line segment having the minimum direction among the subset of directed line segments within set AS having a direction greater than or equal to direction(L)—that is, the line segment having a direction which is closest to but also at least as great as direction(L). If multiple directed line segments satisfy either the criteria for $M_{min}$ or $M_{min+}$, the directed line segment with the maximum length should be selected.

To implement the clockwise determination algorithm, an ordered array of directed line segments leaving a point A should be created as the point is encountered, where the ordering is based on the direction of the exiting line segments, in descending order from maximum to minimum direction. Multiple exiting directed line segments have the same direction but different lengths should be grouped within the array in (secondary sort) order from shortest to longest length. Then, the determination of which exiting directed line segment to select is simple: the direction of each exiting line segment is compared to direction(L) to determine if any have a direction less than direction(L). If the first exiting directed line segment within the ordered array has a direction less than direction(L), the last exiting directed line segment within the ordered array is chosen. Otherwise, the comparison progresses through the array until a line segment having a direction less than direction(L) is encountered, in which case the last preceding entry within the array is selected. If the last entry in the array is encountered before an exiting directed line segment with a direction smaller than direction(L) is found, the last array entry is selected.

In the example depicted in FIG. 2D, line segment FE lies in the same direction as the last entered line segment DF, and is therefore added to the polygon definition:

$P_1=\{(x_C, y_C);(x_D, y_D);(x_F, y_F);(x_E, y_E)\}$, or $P_1=\{(x_C, y_C):(x_D, y_D);$
$(x_D, y_D):(x_F, y_F);$
$(x_F, y_F):(x_E, y_E)\}$.

Figure 2E:
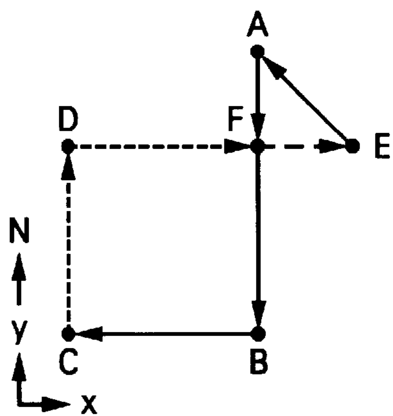

FIG. 2E illustrates line segment FE being removed from the noncrossing general polygon definition and added to the first simple polygon definition.

Figure 2F:
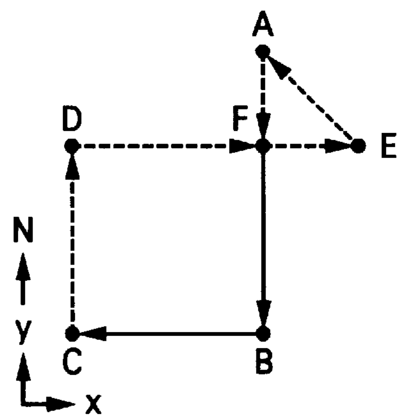

The process described above for selecting connecting line segments to add to the current simple polygon definition is then repeated to add line segments EA and AF to the polygon definition, as illustrated in FIG. 2F:

$P_1=\{(x_C, y_C);(x_D, y_D);(x_F, y_F);(x_E, y_E);$
$(x_A, y_A);(x_F, y_F)\}$, or $P_1=\{(x_C, y_C):(x_D, y_D);$
$(x_D, y_D):(x_F, y_F);$
$(x_F, y_F):(x_E, y_E);$
$(x_E, y_E):(x_A, y_A);$
$(x_A, y_A):(x_F, y_F)\}$.

As each line segment is added to the polygon definition, a check is made to determine whether the same intersection or endpoint has been entered twice. In the example shown, endpoint F will be entered twice upon addition of the line segment AF to the polygon definition. This indicates that a closed path defining a simple polygon has been encountered, and the line segments added to the polygon definition between the first and second entry of the intersection which has been entered twice (endpoint F) are removed from the first simply polygon definition and placed in a second simple polygon definition:

$P_1=\{(x_C, y_C);(x_D, y_D);(x_F, y_F)\}$; and $P_2=\{(x_F, y_F);(x_E, y_E);(x_A, y_A);(x_F, y_F)\}$, or $P_1=\{(x_C, y_C):(x_D, y_D);$
$(x_D, y_D):(x_F, y_F)\}$; and $P_2=\{(x_F, y_F):(x_E, y_E);$
$(x_E, y_E):(x_A, y_A);$
$(x_A, y_A):(x_F, y_F)\}$.

Figure 2G:
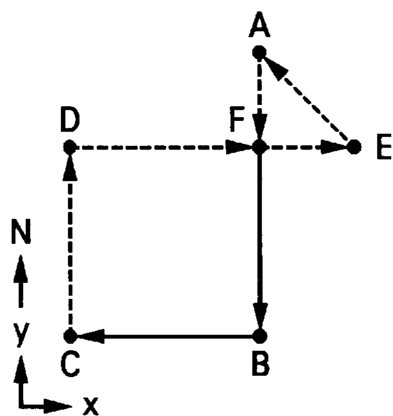

FIG. 2G illustrates the segregation of line segments FE, EA, and AF into a separate simple polygon definition.

Figure 2H:
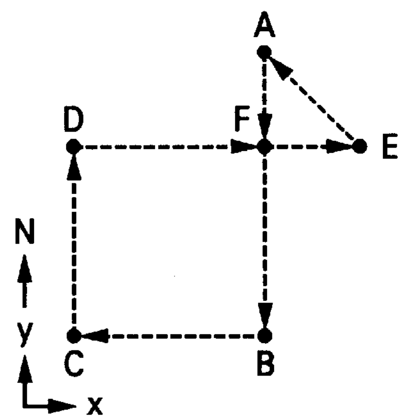

The process previously described for adding exiting line segments to a simple polygon definition is then resumed for polygon P1, resulting in line segments FB and BC being added to the polygon definition for polygon $P_1$, as illustrated in FIG. 2H:

$P_1=\{(x_C, y_C);(x_D, y_D);(x_F, y_F)$
$;(x_B, y_B);(x_C, y_C)\}$; and $P_2=\{(x_F, y_F);(x_E, y_E);(x_A, y_A);(x_F, y_F)\}$, or $P_1=\{(x_C, y_C):(x_D, y_D);$
$(x_D, y_D):(x_F, y_F);$
$(x_F, y_F):(x_B, y_B);$
$(x_B, y_B):(x_C, y_C)\}$; and $P_2=\{(x_F, y_F):(x_E, y_E);$
$(x_E, y_E):(x_A, y_A);$
$(x_A, y_A):(x_F, y_F)\}$.

Once all line segments of the general polygon are accounted for within at least one simple polygon definition, the process of converting general polygons to simple polygons is complete. The result is a list of simple polygons within the general polygon, which may include one or more trivial segment pairs (line segments from point a to point b and back). It should be noted that only simple polygons with odd winding numbers will be found by the process described. The number of simple polygons which will be located will be less than or equal to n/3, where n is the number of line segments within the original general polygon.

Once the general polygon has been converted into simple polygons, the process is only partially complete. In order to be exported to a graphics adapter as primitives for rendering, the simple polygons must be converted into trapezoids, if necessary.

Figure 3A:
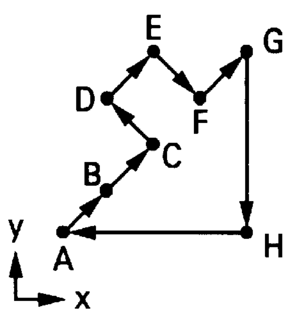
FIGS. 3A–3J depict a series of diagrams illustrating a second portion of a process for converting general polygons into trapezoidal primitives in accordance with a preferred embodiment of the present invention.

With reference now to FIGS. 3A through 3J, a series of diagrams illustrating a second portion of a process for converting general polygons into trapezoidal primitives in accordance with a preferred embodiment of the present invention is depicted. FIG. 3A illustrates a simple polygon, comprising a directed path having the same start and end points and consisting of line segments AB, BC, CD, DE, EF, FG, and GH in the example shown, which are defined by (x, y) coordinate pairs for the endpoints A, B, C, D, E, F, G and H. The polygon depicted differs from that employed to describe the process converting general polygons into simple polygons in order to best explain all aspects of this portion of the process. Again, the example depicted for the purposes of explaining the invention is not necessarily typical or representative of simple polygons which may require conversion to trapezoids for export to a graphics adapter as primitives.

Figure 3B:
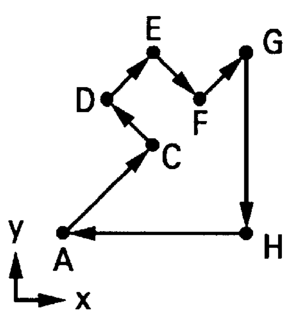

The process for converting a simple polygon into trapezoids (which includes triangles) begins with merging any connecting line segments which have the same slope. Since each node or point in a simple polygon has exactly one line segment entering the point and one line segment exiting the point, joining of consecutive line segments having the same slope simply involves comparison of the slopes for each two consecutive line segments calculated as described above in connection with the determination of exiting directed line segments extending in the same direction or clockwise from a last entered line segment. In the example depicted, line segments AB and BC will thus be merged in the polygon definition as a single line segment AC, as depicted in FIG. 3B.

Starting with the smallest y-coordinate for any line segment in the simple polygon, a point or an east-west line segment is identified. Most graphics adapters render primitives most effectively when at least one edge of a triangle or two edges of a trapezoid have a constant y-coordinate value. Therefore, starting with a simple polygon, a point or horizontal line X having the smallest y-coordinate value is selected as the starting place. In the example depicted, line segment HA satisfies these criteria, and thus serves as the starting place for breaking the simple polygon into trapezoidal primitives.

For the selected line X, $X_{enter}$ is set to the head of X, which is the end of directed line segment X entering a point, while $X_{exit}$ is set to the tail of X, which is the end of directed line segment X exiting a point. Thus, if a line segment within the simple polygon has the minimum y-coordinate value, $X_{enter}$ and $X_{exit}$ are the ends of that line segment X. If a single point within the simple polygon has the minimum y-coordinate value, then $X_{enter}$ and $X_{exit}$ are the same and are equal to that point.

The left and right adjoining lines for the point or line segment serving as the starting place are next located, which in the present example comprises line segments AC and GH. The coordinates for the head of the adjoining line segment exiting the starting place (AC), $(x_1, y_1)$, and for the tail of the adjoining line segment entering the starting place (GH), $(x_2, y_2)$, are then identified.

The coordinates $(x_1, y_1)$ and $(x_2, y_2)$ are then compared and, if $y_1=y_2$, a line segment Z having endpoints tail=$(x_1, y_1)$ and head=$(x_2, y_2)$ is identified. If $y_1!=y_2$, $\min(y_1, y_2)$ is determined and the line segment associated with $\max(y_1, y_2)$ is broken at the point corresponding to a y-coordinate value of $\min(y_1, y_2)$ A line segment Z is identified having endpoints of:

$$\begin{aligned} \text{tail} &= (x_1, y_1) \quad \text{if} \quad y_1 < y_2; \\ &= (x_{enter} + (x_1 - x_{enter}) * ((y_2 - y_{enter}) / \\ &\quad (y_1 - y_{enter})), y_2) \quad \text{if} \quad y_1 > y_2; \quad \text{and} \\ \text{head} &= (x_{exit} + (x_2 - x_{exit}) * ((y_1 - y_{exit}) / \\ &\quad (y_2 - y_{exit})), y_1) \quad \text{if} \quad y_1 < y_2; \\ &= (x_2, y_2) \quad \text{if} \quad y_1 > y_2, \end{aligned}$$

where $(x_{enter}, y_{enter})$ are the coordinates for $x_{enter}$ and $(x_{exit}, y_{exit})$ are the coordinates for $x_{exit}$. The adjoining line segment associated with $\max(y_1, y_2)$ is thus split at the point $(x_{enter}+(x_1-x_{enter})*((y_2-y_{enter})/(y_1-y_{enter})), y_2)$ if $y_1$ is greater than $y_2$ and $(x_{exit}+(x_2-x_{exit})*((y_1-y_{exit})/ (y_2-y_{exit})), y_1)$ if $y_1$ is greater than $y_2$.

Figure 3C:
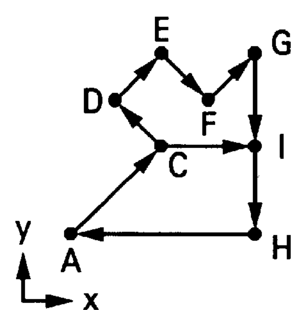

In the example depicted, line segment AC is associated with $\min(y_1, y_2)$ and line segment GH is associated with $\max (y_1, y_2)$. Therefore, line segment GH is broken into two line segments GI and IH as depicted in FIG. 3C. The y-coordinate value of endpoint I equals the y-coordinate value of endpoint C.

Line segments HA, AC, CI and IH are then segregated from the remainder of the simple polygon and added to a trapezoid list:

$T_1=\{(x_H, y_H):(x_A, y_A);$
$(x_A, y_A):(x_C, y_C);$
$(x_C, y_C):(x_I, y_I);$
$(x_I, y_I):(x_H, y_H);$

Figure 3D:
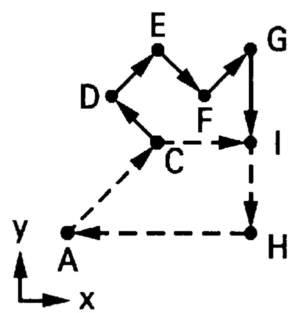
Figure 3E:
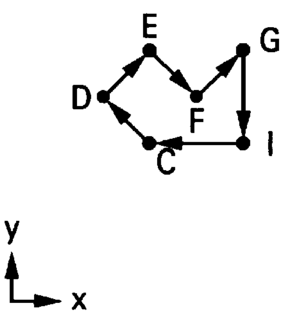
Figure 3F:
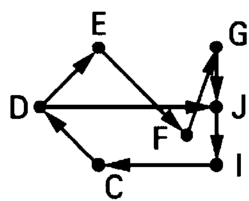
Figure 3F:
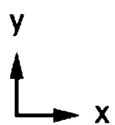

FIG. 3D illustrates the simple polygon with the identified line segments removed. A line segment with the opposite head and tail endpoints of line segment Z (CI) is then added to the simple polygon to complete the directed path as shown in FIG. 3E.

The point or line segment remaining in the simple polygon which has the lowest y-coordinate value is again identified and serves as the new starting place. In the example depicted, line segment CI becomes the new starting place. The left and right adjoining line segments, CD and GI, are identified, and $\min(y_1, y_2)$ and $\max(y_1, y_2)$ are found.

Figure 3G:
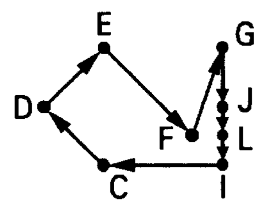
Figure 3G:
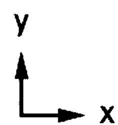

Each time a Z line segment is introduced (line segment DJ in FIG. 3F), a check is made to determine if any other line segment in the remaining simple polygon crosses the Z line segment. The y-coordinate values for all remaining line segments (other than the starting place and the adjoining line segments) are checked to determine if any has a y-coordinate value equal to or smaller than $\min(y_1, Y_2)$. If not, the process proceeds as described above. If a lower y-coordinate value is found (as for endpoint F in FIG. 3F), however, the adjoining line segments (CD and JI) are both broken at y-coordinate locations corresponding to the lower y-coordinate value as illustrated in FIG. 3G (line segments CK and KD, JL and LI), and the process of identifying a trapezoidal primitive is restarted.

Figure 3H:
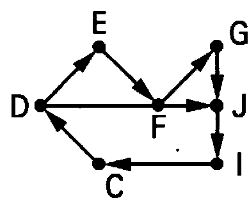
Figure 3H:
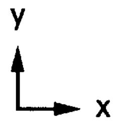
Figure 3I:
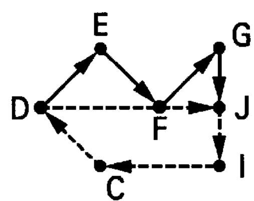
Figure 3I:
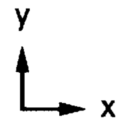

If no line segment crosses the Z segment, but one or more line segments other than the adjoining line segments has a y-coordinate value equal to $\min(y_1, y_2)$, as shown in FIG. 3H, the process of segregating line segments out for a separate trapezoid proceeds as described above:

$T_1=\{(x_H, y_H):(x_A, y_A);$
$(x_A, y_A):(x_C, y_C);$
$(x_C, y_C):(x_I, y_I);$
$(x_I, y_I):(x_H, y_H)\};$
$T_2=\{(x_I, y_I):(x_C, y_C);$
$(x_C, y_C):(x_D, y_D);$
$(x_D, y_D):(x_J, y_J);$
$(x_J, y_J):(x_I, y_I)\}.$

Figure 3J:
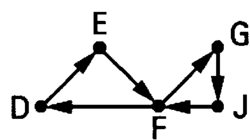
Figure 3J:
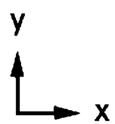

Since the y-coordinate value of endpoint F equalled the y-coordinate value of endpoints D and J, however, the replacement for Z segment DJ is broken in two: JF and FD, as depicted in FIG. 3J. From there, the process of adding triangles comprising line segments FD, DE and EF and line segments JF, FG and GJ to the trapezoid list is trivial:

$T_1=\{(x_H, y_H):(x_A, y_A);$
$(x_A, y_A):(x_C, y_C);$
$(x_C, y_C):(x_I, y_I);$
$(x_I, y_I):(x_H, y_H)\};$
$T_2=\{(x_I, y_I):(x_C, y_C);$
$(x_C, y_C):(x_D, y_D);$
$(x_D, y_D):(x_J, y_J);$
$(x_J, y_J):(x_I, y_I)\}$
$T_3=\{(x_F, y_F):(x_D, y_D);$
$(x_D, y_D):(x_E, y_E);$
$(x_E, y_E):(x_F, y_F);$
$T_4=\{(x_J, y_J):(x_F, y_F);$
$(x_F, y_F):(x_G, y_G);$
$(x_G, y_G):(x_J, y_J)\}.$

Once all line segments within the original simple polygon have been segregated into the trapezoid list, the process of converting general polygons into trapezoidal primitives is complete.

Figure 4A:
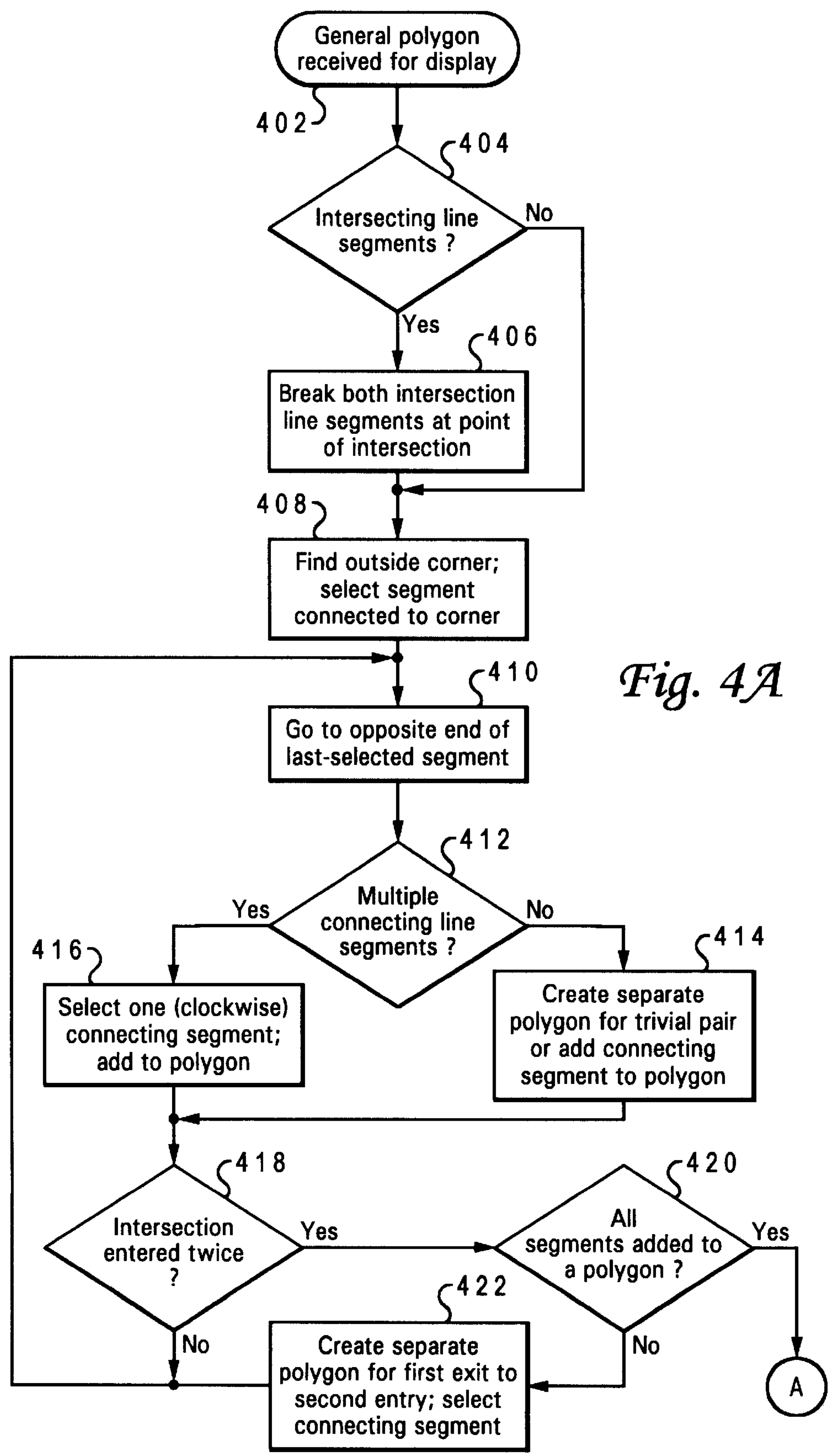
FIGS. 4A–4B are a high level flowchart for a process of converting general polygons into trapezoidal primitives in accordance with a preferred embodiment of the present invention.
Figure 4B:
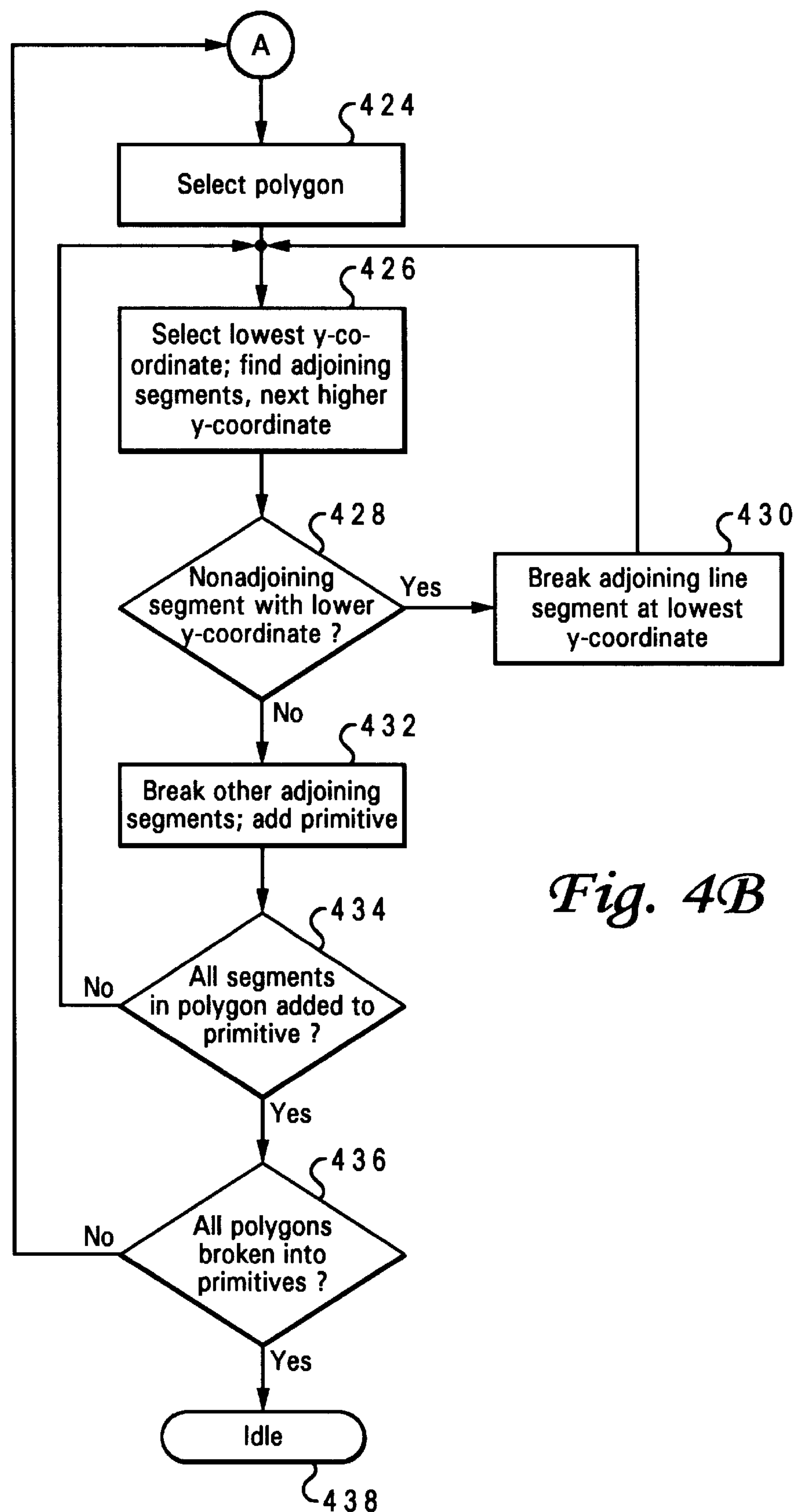

Referring to FIGS. 4A and 4B, a high level flowchart for a process of converting general polygons into trapezoidal primitives in accordance with a preferred embodiment of the present invention is illustrated. The process begins at step 402 in FIG. 4A, which depicts receiving a general polygon for display. The portion of the process depicted in FIG. 4A relates to finding simple polygons within the general polygon and corresponds to the description accompanying FIGS. 2A–2H above. The process first passes to step 404, which illustrates determining whether the general polygon received includes any intersecting line segments. If not, the process proceeds directly to step 408. If so, however, the process proceeds instead first to step 406, which depicts breaking both of the intersecting line segments at the point of intersection.

The process then passes to step 408, which illustrates finding an outside corner and selecting a line segment connected to that corner. The outside corner may be selected by finding an extreme x- or y-coordinate or x- and y-coordinate pair. The line segment selected should be related to the outside corner selected. For example, if the southwest corner is selected, either the line segment north or clockwise from north or the line segment east or counterclockwise from east should be selected. In either case, the selected line segment is added to a polygon definition.

The process next passes to step 410, which depicts proceeding to the opposite end of the line segment selected, and then to step 412, which illustrates a determination of whether multiple line segments are connected to the opposite end of the last selected line segment. If not, the process proceeds to step 414, which illustrates creating a separate polygon if the only connecting line segment creates a trivial pair of line segments (running from point a to point b and back again) or, otherwise, adding the only connecting line segment to the current polygon definition and passing to step 418.

If multiple line segments are connected to the second end of the last selected line segment, the process proceeds instead from step 412 to step 416, which depicts selecting one of the connecting line segments and adding it to the current polygon definition. The criteria employed to select a line segment may be arbitrary, but should preferably be directionally consistent from line segment to line segment, such as the line segment which is closest in a clockwise or counterclockwise direction from the linear direction of the last selected line segment. Such a criteria selection will facilitate finding simple polygons within the general polygon by traversing an outside perimeter of the simple polygons.

From either of steps 414 or 416, the process next proceeds to step 418, which illustrates a determination of whether a line segment connection or intersection point has been entered twice. If not, no simple polygon has yet been identified, and the process returns to step 410. If so, however, a simple polygon has been identified within the general polygon and the process proceeds instead to step 420, which depicts a determination of whether all line segments making up the general polygon have been added to at least one simple polygon definition.

If all line segments within the general polygon have not yet been considered, the process proceeds from step 420 to step 422, which illustrates creating a separate simple polygon definition for all line segments from the first exit of the twice-entered connection point until the second entry. These line segments form a separate simple polygon and are removed from the current simple polygon definition. The process then returns to step 410 to find another line segment connected to the second end of the last selected line segment, in order to find other simple polygons within the general polygon.

Referring again to step 420, if all line segments within the general polygon have been considered, the process proceeds instead to step 424 in FIG. 4B. The portion of the process depicted in FIG. 4B relates to breaking any simple polygons identified into trapezoidal primitives and corresponds to the description accompanying FIGS. 3A-3H. Step 424 depicts selecting a polygon from the simple polygons previously identified. The process then passes to step 426, which illustrates selecting the connection point or east-west line segment having the lowest y-coordinate value (referred to herein as the "base" connection point or line segment), finding the adjoining lines connected to that base connection point or line segment, and then identifying the next higher y-coordinate endpoint value for the two adjoining line segments. The adjoining line segment including this endpoint with the next higher y-coordinate value will be referred to as the "reference" adjoining line segment.

The process next passes to step 428, which depicts a determination of whether any nonadjoining line segments remaining within the simple polygon definition have a y-coordinate value which is lower than the next-higher y-coordinate value of an adjoining line segment. If so, the process proceeds to step 430, which illustrates breaking the adjoining line segment having the next-higher y-coordinate at the y-coordinate level of the nonadjoining line y-coordinate which is lower (that is, at the second lowest y-coordinate level remaining in the polygon definition). The process then returns to step 426 to restart the process of locating a trapezoidal primitive.

Referring again to step 428, if no nonadjoining line segment has a lower y-coordinate value than the next-higher y-coordinate of an adjoining line segment, the process proceeds instead to step 432, which illustrates breaking the other adjoining line segment (which does not terminate at the next-higher y-coordinate endpoint) at the y-coordinate level of next-high y-coordinate endpoint, and adding a primitive to the primitive list including the base connection point or line segment, the reference adjoining line segment, the portion of the other adjoining line segment from the break point to the base connection point or line segment, and a line segment connecting the two adjoining line segments from the reference endpoint to the break point.

From either of step 432, the process next passes to step 434, which depicts a determination of whether all segments in the original polygon which have been included in the definition of at least one trapezoidal primitive. If not, the process returns to step 426 to determine the new base connection point or line segment and continue breaking the polygon into trapezoidal primitive. If so, however, the process proceeds instead to step 436, which illustrates a determination of whether all simple polygons from the original general polygon have been processed. If not, the process returns to step 424 to process the next polygon; if so, however, the process proceeds to step 438, which depicts the process becoming idle until another general polygon is received.

The present invention allows general polygons to be broken into trapezoids and/or triangles for export to a graphics adapter, where the requisite rendering may be performed without consuming further processor resources. Maximum utilization of the graphics adapter is thus achieved. Although the processor must perform the step required to convert the general polygon into trapezoidal primitives, in most cases this should involve significantly less work than required to break the general polygon into scan lines and export pixel information to the graphics adapter.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of processing display objects, comprising:

receiving a general polygon for display;

converting the general polygon into at least one simple polygon by:

adding line segments defining the general polygon to a simple polygon definition until a closed path bounding a single contiguous area is delimited by line segments within the simple polygon definition;

adding the simple polygon definition to a simple polygon list;

repeating the steps of adding line segments to a simple polygon definition and adding the simple polygon definition to the simple polygon list until all line segments defining the general polygon have been added to at least one simple polygon definition within the simple polygon list; and converting the at least one simple polygon into at least one primitive for export to a graphics adapter.

2. The method of claim 1, wherein the step of receiving a general polygon for display further comprises:

receiving a plurality of line segments forming a directed path having a single start and end point.

3. The method of claim 1, wherein the step of converting the general polygon into at least one simple polygon further comprises:

(a) selecting an endpoint for at least one line segment bounding the general polygon which has an extreme x- or y-coordinate value;

(b) adding a line segment connecting the selected endpoint to an opposite endpoint to a simple polygon definition in a polygon list;

(c) adding to the polygon definition a line segment connecting an endpoint for a preceding line segment with a second endpoint;

(d) repeating step (c) until the second endpoint for a line segment last added to the simple polygon definition matches the second endpoint for a line segment previously added to the simple polygon definition;

(e) segregating line segments within the simple polygon definition from the line segment after the previously added line segment up to and including the last added line segment into a separate simple polygon definition; and (f) repeating steps (c) through (e) until all line segments within the general polygon have been added to at least one simple polygon definition within the polygon list.

4. The method of claim 1, wherein the step of converting the at least one simple polygon into at least one primitive for export to a graphics adapter further comprises:

converting the at least one simple polygon into at least one trapezoid.

5. The method of claim 1, wherein the step of converting the at least one simple polygon into at least one primitive for export to a graphics adapter further comprises:

converting the at least one simple polygon into at least one triangle.

6. The method of claim 1, wherein the step of converting the at least one simple polygon into at least one primitive for export to a graphics adapter further comprises:

converting the at least one simple polygon into a plurality of trapezoids and/or triangles.

7. The method of claim 1, wherein the step of converting the at least one simple polygon into at least one primitive for export to a graphics adapter further comprises:

identifying a base structure comprising a connection point or a constant y-coordinate valued line segment having a lowest y-coordinate value for a simple polygon;

identifying line segments adjoining the base structure;

determining a next-lowest y-coordinate value for a line segment adjoining the base structure;

determining whether a nonadjoining line segment includes an endpoint having a y-coordinate value lower than the next-lowest y-coordinate value; and responsive to determining that no nonadjoining line segment includes an endpoint having a y-coordinate value lower than the next-lowest y-coordinate value:

breaking an adjoining line segment other than the adjoining line segment having the next-lowest y-coordinate value at the next-lowest y-coordinate value; and adding a primitive to a primitive list including the adjoining line segment having the next-lowest y-coordinate value and a portion of the other adjoining line segment extending from the next-lowest y-coordinate value to the base.

8. A system for processing display objects, comprising:

a graphics adapter receiving primitives for rendering; and a processor coupled to the graphics adapter and executing instructions to selectively:

receive a general polygon for display;

convert the general polygon into at least one simple polygon by:

adding line segments defining the general polygon to a simple polygon definition until a closed path bounding a single contiguous area is delimited by line segments within the simple polygon definition;

adding the simple polygon definition to a simple polygon list;

repeating the steps of adding line segments to a simple polygon definition and adding the simple polygon definition to the simple polygon list until all line segments defining the general polygon have been added to at least one simple polygon definition within the simple polygon list; and convert the at least one simple polygon into at least one primitive for export to the graphics adapter.

9. The system of claim 8, wherein the processor receives a general polygon comprising a plurality of line segments forming a directed path having a single start and end point.

10. The system of claim 8, wherein the processor converts the general polygon into at least one simple polygon by:

(a) selecting an endpoint for at least one line segment bounding the general polygon which has an extreme x- or y-coordinate value;

(b) adding a line segment connecting the selected endpoint to an opposite endpoint to a simple polygon definition in a polygon list;

(c) adding to the polygon definition a line segment connecting an endpoint for a preceding line segment with a second endpoint;

(d) repeating step (c) until the second endpoint for a line segment last added to the simple polygon definition matches the second endpoint for a line segment previously added to the simple polygon definition;

(e) segregating line segments within the simple polygon definition from the line segment after the previously added line segment up to and including the last added line segment into a separate simple polygon definition; and (f) repeating steps (c) through (e) until all line segments within the general polygon have been added to at least one simple polygon definition within the polygon list.

11. The system of claim 8, wherein the processor converts the at least one simple polygon into at least one trapezoid.

12. The system of claim 8, wherein the processor converts the at least one simple polygon into at least one triangle.

13. The system of claim 8, wherein the processor converts the at least one simple polygon into a plurality of trapezoids and/or triangles.

14. The system of claim 8, wherein the processor converts the at least one simple polygon into at least one primitive for export to a graphics adapter by:

identifying a base structure comprising a connection point or a constant y-coordinate valued line segment having a lowest y-coordinate value for a simple polygon;

identifying line segments adjoining the base structure;

determining a next-lowest y-coordinate value for a line segment adjoining the base structure;

determining whether a nonadjoining line segment includes an endpoint having a y-coordinate value lower than the next-lowest y-coordinate value; and responsive to determining that no nonadjoining line segment includes an endpoint having a y-coordinate value lower than the next-lowest y-coordinate value:

breaking an adjoining line segment other than the adjoining line segment having the next-lowest y-coordinate value at the next-lowest y-coordinate value; and adding a primitive to a primitive list including the adjoining line segment having the next-lowest y-coordinate value and a portion of the other adjoining line segment extending from the next-lowest y-coordinate value to the base.

15. A computer program product within a computer usable medium of instructions, comprising:

instructions for receiving a general polygon for display;

instructions for converting the general polygon into at least one simple polygon including:

instructions for adding line segments defining the general polygon to a simple polygon definition until a closed path bounding a single contiguous area is delimited by line segments within the simple polygon definition;

instructions for adding the simple polygon definition to a simple polygon list;

instructions for repeating execution of the instructions for adding line segments to a simple polygon definition and adding the simple polygon definition to the simiple polygon list until all line segments defining the general polygon have been added to at least one simple polygon definition within the simple polygon list; and instructions for converting the at least one simple polygon into at least one primitive for export to a graphics adapter.

16. The computer program product of claim 15, wherein the instructions for receiving a general polygon for display further comprises:

instructions for receiving a plurality of line segments forming a directed path having a single start and end point.

17. The computer program product of claim 15, wherein the instructions for converting the general polygon into at least one simple polygon further comprises:

(a) instructions for selecting an endpoint for at least one line segment bounding the general polygon which has an extreme x- or y-coordinate value;

(b) instructions for adding a line segment connecting the selected endpoint to an opposite endpoint to a simple polygon definition in a polygon list;

(c) instructions for adding to the polygon definition a line segment connecting an endpoint for a preceding line segment with a second endpoint;

(d) instructions for repeating execution of instructions (c) until the second endpoint for a line segment last added to the simple polygon definition matches the second endpoint for a line segment previously added to the simple polygon definition;

(e) instructions for segregating line segments within the simple polygon definition from the line segment after the previously added line segment up to and including the last added line segment into a separate simple polygon definition; and (f) instructions for repeating execution of instructions (c) through (e) until all line segments within the general polygon have been added to at least one simple polygon definition within the polygon list.

18. The computer program product of claim 15, wherein the instructions for converting the at least one simple polygon into at least one primitive for export to a graphics adapter further comprises:

instructions for converting the at least one simple polygon into at least one trapezoid.

19. The computer program product of claim 15, wherein the instructions for converting the at least one simple polygon into at least one primitive for export to a graphics adapter further comprises:

instructions for converting the at least one simple polygon into at least one triangle.

20. The computer program product of claim 15, wherein the instructions for converting the at least one simple polygon into at least one primitive for export to a graphics adapter further comprises:

instructions for converting the at least one simple polygon into a plurality of trapezoids and/or triangles.

21. The computer program product of claim 15, wherein the instructions for converting the at least one simple polygon into at least one primitive for export to a graphics adapter further comprises:

instructions for identifying a base structure comprising a connection point or a constant y-coordinate valued line segment having a lowest y-coordinate value for a simple polygon;

instructions for identifying line segments adjoining the base structure;

instructions for determining a next-lowest y-coordinate value for a line segment adjoining the base structure;

instructions for determining whether a nonadjoining line segment includes an endpoint having a y-coordinate value lower than the next-lowest y-coordinate value; and instructions, responsive to determining that no non-adjoining line segment includes an endpoint having a y-coordinate value lower than the next-lowest y-coordinate value, for:

breaking an adjoining line segment other than the adjoining line segment having the next-lowest y-coordinate value at the next-lowest y-coordinate value; and adding a primitive to a primitive list including the adjoining line segment having the next-lowest y-coordinate value and a portion of the other adjoining line segment extending from the next-lowest y-coordinate value to the base.

* * * * *

UNITED STATES PATENT AND TRADEMARK OFFICE

CERTIFICATE OF CORRECTION

PATENT NO. : 6,285,375 B1
DATED : September 4, 2001
INVENTOR(S) : John, Jr.

It is certified that error appears in the above-identified patent and that said Letters Patent is hereby corrected as shown below:

Title page,
Item [54], please add the word -- AN -- before the word "ALGORITHM";

Column 5,
Line 48, please change the formula "(xj, yi))" to -- (xj,yj)) --

Signed and Sealed this

Seventeenth Day of September, 2002

*Attest:*

JAMES E. ROGAN

*Attesting Officer*

*Director of the United States Patent and Trademark Office*